(12) United States Patent
Guan et al.

(10) Patent No.: US 9,800,777 B2
(45) Date of Patent: Oct. 24, 2017

(54) IMAGE PROCESSING APPARATUS, IMAGE CAPTURING APPARATUS, AND STORAGE MEDIUM STORING IMAGE PROCESSING PROGRAM

(71) Applicants: Haike Guan, Kanagawa (JP); Norikatsu Niinami, Kanagawa (JP)

(72) Inventors: Haike Guan, Kanagawa (JP); Norikatsu Niinami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/009,295

(22) Filed: Jan. 28, 2016

(65) Prior Publication Data
US 2016/0227104 A1    Aug. 4, 2016

(30) Foreign Application Priority Data
Jan. 29, 2015    (JP) .................................. 2015-015424

(51) Int. Cl.
*H04N 5/232*    (2006.01)
*H04N 5/353*    (2011.01)
*G06T 7/246*    (2017.01)

(52) U.S. Cl.
CPC ......... *H04N 5/23216* (2013.01); *G06T 7/248* (2017.01); *H04N 5/23212* (2013.01); (Continued)

(58) Field of Classification Search
CPC ........... H04N 5/23212; H04N 5/23216; H04N 5/23219; H04N 5/23222; H04N 5/2352–5/2354; H04N 5/238; H04N 5/243; H04N 5/353–5/3537; G06T 7/20; G06T 7/246; G06T 7/248; G06T 7/251; (Continued)

(56) References Cited

U.S. PATENT DOCUMENTS

2008/0284900 A1*  11/2008  Abe ........................ G03B 3/00
                                                                    348/349
2009/0196461 A1*   8/2009  Iwamoto ................. G03B 7/28
                                                                    382/103

(Continued)

FOREIGN PATENT DOCUMENTS

JP    2011-193443    9/2011
JP    2011-223242   11/2011
JP    2012-164002    8/2012

*Primary Examiner* — Paul Berardesca
(74) *Attorney, Agent, or Firm* — Oblon, McClelland, Maier & Neustadt, L.L.P.

(57) ABSTRACT

An image processing apparatus for processing images captured by an image capturing apparatus includes an image input unit to receive a plurality of image frames of a subject captured by the image capturing apparatus along the time line; a tracking area setting unit to set a target tracking area on the plurality of image frames; a tracking unit to track the target tracking area on the plurality image frames; a subject condition prediction unit to predict a condition of the subject at a time point delayed from a time point when the most recent image frame of the plurality of image frames is captured based on a tracking result of the target tracking area; and a parameter setting unit to set a parameter to be used for an image capturing of the subject based on the predicted condition of the subject to the image capturing apparatus.

8 Claims, 6 Drawing Sheets

(52) U.S. Cl.
CPC ... *H04N 5/353* (2013.01); *G06T 2207/10016* (2013.01); *G06T 2207/30236* (2013.01)

(58) Field of Classification Search
CPC ............... G06T 7/62; G06T 7/70–7/77; G06T 2207/20068; G06T 2207/20076
See application file for complete search history.

(56) References Cited

U.S. PATENT DOCUMENTS

| | | |
|---|---|---|
| 2009/0310955 A1* | 12/2009 | Lien ........................ G03B 7/093 396/153 |
| 2011/0122264 A1 | 5/2011 | Yamanaka et al. |
| 2011/0298946 A1 | 12/2011 | Guan et al. |
| 2012/0275648 A1 | 11/2012 | Guan |
| 2012/0293665 A1 | 11/2012 | Guan |
| 2013/0063605 A1 | 3/2013 | Guan |
| 2013/0314548 A1 | 11/2013 | Guan et al. |
| 2013/0322692 A1 | 12/2013 | Guan |
| 2014/0098196 A1 | 4/2014 | Guan |
| 2014/0133699 A1 | 5/2014 | Guan |
| 2014/0254872 A1 | 9/2014 | Guan |
| 2015/0029357 A1* | 1/2015 | Hamalainen ............. G02B 7/36 348/223.1 |

* cited by examiner

IMAGE PROCESSING APPARATUS, IMAGE CAPTURING APPARATUS, AND STORAGE MEDIUM STORING IMAGE PROCESSING PROGRAM

CROSS-REFERENCE TO RELATED APPLICATION

This application claims priority pursuant to 35 U.S.C. §119(a) to Japanese Patent Application No. 2015-015424, filed on Jan. 29, 2015 in the Japan Patent Office, the disclosure of which is incorporated by reference herein in its entirety.

BACKGROUND

Technical Field

The present invention relates to an image processing apparatus, an image capturing apparatus, and a storage medium storing an image processing program.

Background Art

Image capturing apparatuses have been employed to track moving subjects or objects, in which the image capturing apparatus continuously captures a plurality of image frames along the time line to track a moving subject, and performs the focus and exposure control for capturing images of the moving subject based on a tracking result.

For example, a camera system applying a template matching process to enhance detection precision of a tracking target is known. Specifically, the camera system corrects brightness of a template image indicating a feature of a subject (tracking target) based on a change of brightness between an area of current position of the tracking target and an area of predicted movement position of the tracking target in the image frames.

A description is given of a scheme of a subject tracking with reference to FIG. 9, in which a train moving with a high speed is tracked as a subject. When a digital camera is used for capturing an image, a shutter is half-pressed to set the focus and exposure level, and then the shutter is released to capture one or more images.

Figure 9A:
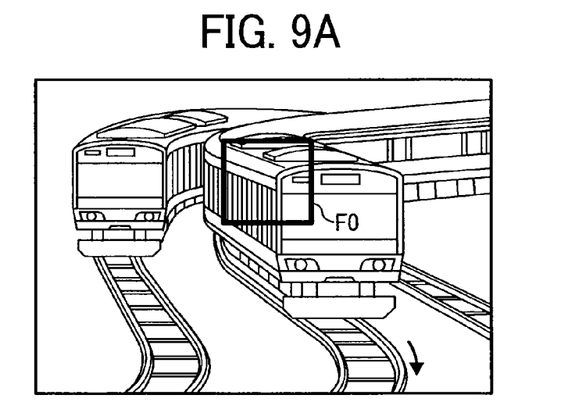
FIGS. 9A, 9B and 9C schematically illustrate image frames set with target tracking areas used for a subject tracking implementable by a conventional image processing apparatus.
Figure 9B:
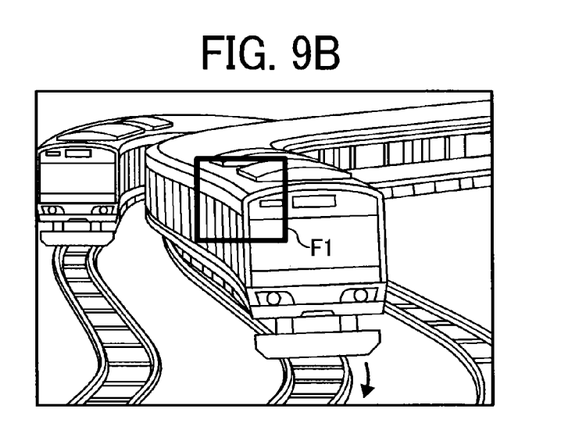
Figure 9C:
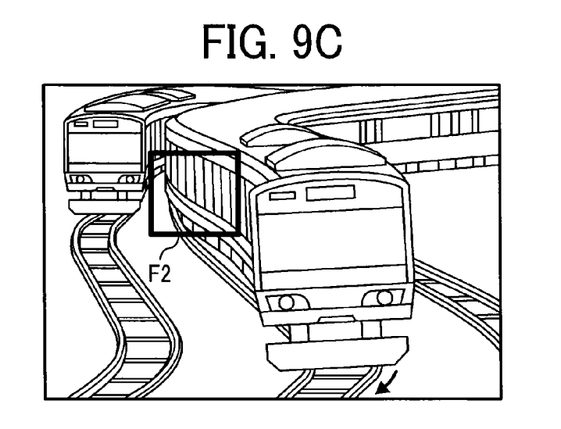

At a timing of FIG. 9A, a user half-presses the shutter to set a target tracking area of the subject as indicated by a rectangular frame F0. Then, the camera performs the subject tracking and obtains a tracking result indicated by a rectangular frame F1 as shown in FIG. 9B. The focus and the exposure level are set based on the tracking result of FIG. 9B, and then the user releases the shutter of the camera.

However, since the camera requires a given time period to activate the image capturing process, the subject moves from a position of FIG. 9B to another position in the given time period. Therefore, when the camera captures an image of the subject actually, the subject changes its position from the position of FIG. 9B to the position of FIG. 9C, which means the position of the subject of FIG. 9C (rectangular frame F2) deviates from the position of the subject of FIG. 9B (rectangular frame F1) used for setting the focus and the exposure level, which means a delay of the image capturing (i.e., time lag) occurs between FIGS. 9B and 9C. Therefore, an image of the subject in an actually captured image is out of the focus, and thereby the image of the subject blurs. Further, the exposure level of FIG. 9C also changes from the exposure level of FIG. 9B, and thereby the image is captured actually without setting the correct exposure level.

When a moving subject is captured by a camera, a position of the subject at a moment of the image capturing is required to be measured correctly, and the focus and the exposure level are also required to be set correctly. However, the focus and the exposure level of the subject may change from a time point when the shutter of the camera is half-pressed to a time point when the shutter of the camera is released.

SUMMARY

As one aspect of the present invention, an image processing apparatus for processing images captured by an image capturing apparatus having an optical unit is devised. The image processing apparatus includes an image input unit to receive a plurality of image frames of a subject captured by the image capturing apparatus along the time line from the image capturing apparatus; a tracking area setting unit to set a target tracking area on the plurality of image frames; a tracking unit to track the target tracking area on the plurality image frames along the time line: a subject condition prediction unit to predict a condition of the subject at a time point delayed from a time point when the most recent image frame of the plurality of image frames is captured based on a tracking result of the target tracking area being tracked along the plurality of image frames; and a parameter setting unit to set a parameter to be used for an image capturing of the subject based on the condition of the subject predicted by the subject condition prediction unit to the image capturing apparatus.

As another aspect of the present invention, an image capturing apparatus is devised. The image capturing apparatus includes an image capture unit including an optical unit to capture and output a plurality of image frames of the subject along the time line; an image input unit to receive a plurality of image frames of the subject captured by the image capture unit; a tracking area setting unit to set a target tracking area on the plurality of image frames; a tracking unit to track the target tracking area on the plurality image frames along the time line: a subject condition prediction unit to predict a condition of the subject at a time point delayed from a time point when the most recent image frame of the plurality of image frames is captured based on a tracking result of the target tracking area being tracked along the plurality of image frames; and a parameter setting unit to set a parameter to be used for an image capturing of the subject to the image capture unit based on the condition of the subject predicted by the subject condition prediction unit.

As another aspect of the present invention, a non-transitory storage medium storing a program that, when executed by a computer, causes the computer to execute a method of processing a plurality of image frames of a subject captured by an image capturing apparatus is devised. The method includes inputting the plurality of image frames of the subject captured by the image capturing apparatus along the time line; setting a target tracking area on the plurality of image frames input at the inputting step; tracking the target tracking area, set at the setting step, on the plurality of image frames along the time line; predicting a condition of the subject at a time point delayed from a time point when the most recent image frame of the plurality of image frames is captured along the time line based on a tracking result of the target tracking area obtained at the tracking step; and setting a parameter to be used for an image capturing of the subject based on the condition of the subject predicted at the predicting step to the image capturing apparatus.

BRIEF DESCRIPTION OF THE DRAWINGS

A more complete appreciation of the disclosure and many of the attendant advantages and features thereof can be

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more image processing apparatuses according to one or more example embodiments are described hereinafter.

A description is given of an image processing apparatus 1 according to one or more example embodiments of the present invention with reference to drawings.

Figure 1:
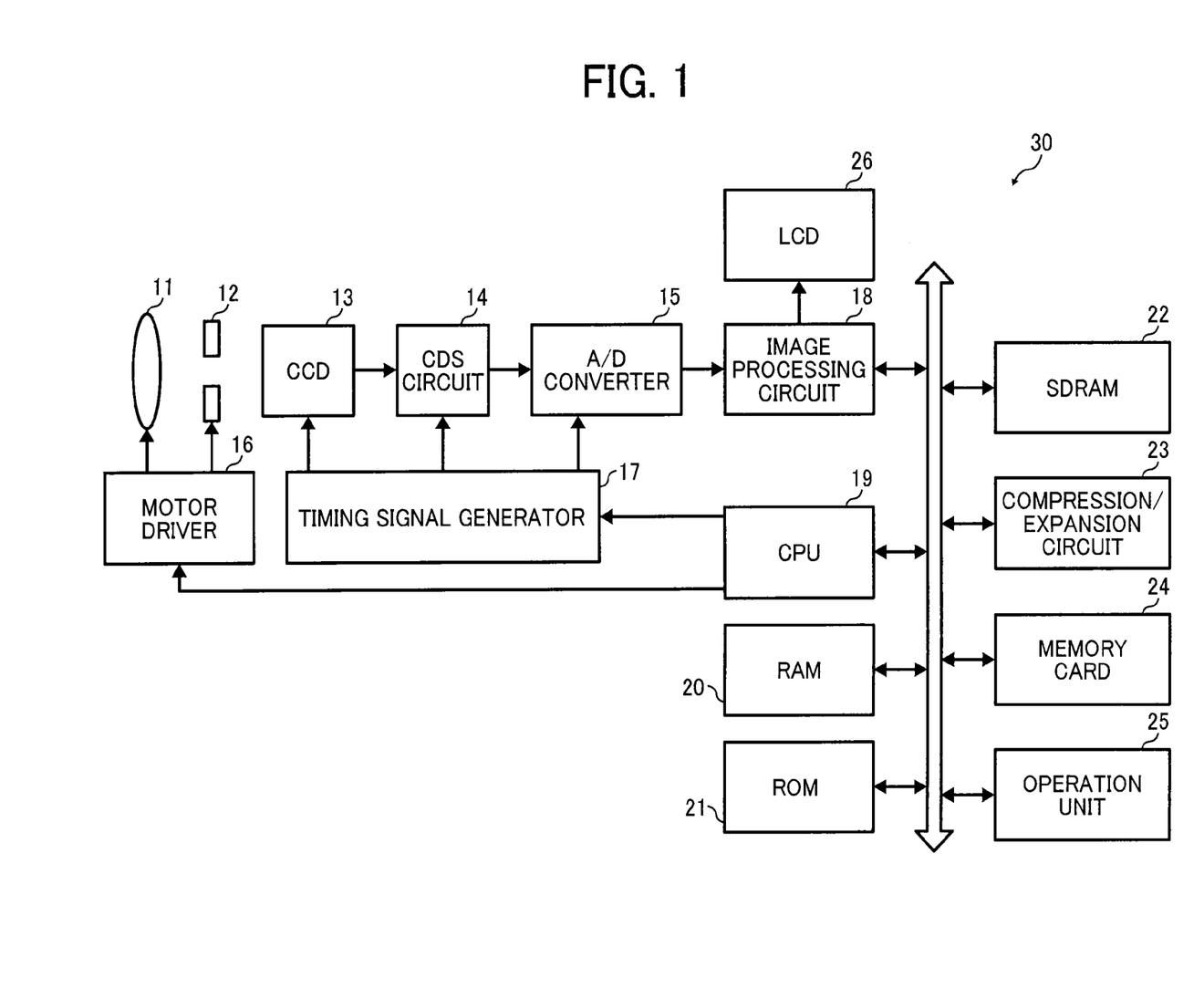
FIG. 1 is an example of a block diagram of a hardware configuration of an image capturing apparatus according to one or more example embodiments of the present invention.

FIG. 1 is an example of a block diagram of a hardware configuration of an image capturing apparatus 30. As illustrated in FIG. 1, the image capturing apparatus 30 that can capture images of a subject includes, for example, an optical unit 11, a shutter 12, a charge coupled device (CCD) 13, a correlated double sampling (CDS) circuit 14, an analog/digital (A/D) converter 15, a motor driver 16, and a timing signal generator 17. The image capturing apparatus 30 further includes, for example, an image processing circuit 18, a central processing unit (CPU) 19, a random access memory (RANI) 20, a read only memory (ROM) 21, a synchronous dynamic random access memory (SDRAM) 22, a compression/expansion circuit 23, a memory card 24, an operation unit 25, and a liquid crystal display (LCD) 26. As described in this specification, an image processing according to one or more example embodiments of the present invention can be performed by an image processing apparatus 1 shown in FIG. 3. The image capturing apparatus 30 is an example of the image processing apparatus 1, in which the image capturing and the image processing is performable by the image capturing apparatus 30. Further, the image processing can be performed by using an image capturing device and an image processing apparatus, in which the image capturing is performed by the image capturing device, and the image processing is performed by the image processing apparatus.

The optical unit 11 includes at least one or more lenses used for capturing an image of a subject. The shutter 12 such as a mechanical shutter is disposed between the optical unit 11 and the CCD 13 to block or pass light coming from the subject and passing through the optical unit 11 to the CCD 13. The CCD 13, used as an image generator, includes an imaging face, which may be also referred to an image forming face or an image generation face. The CCD 13 converts an optical image formed or generated on the imaging face (image forming or generation face) to analog image signals. At least the optical unit 11, the shutter 12, and the charge coupled device (CCD) 13 can be collectively used as an image capture unit to capture an image of a subject. For example, the image capture unit can capture and output a plurality of image frames of the subject along the time line.

The CDS circuit 14 removes nose components from the analog image signals converted by the CCD 13. The A/D converter 15 converts the analog image signals that has removed the nose components by the CDS circuit 14 to digital image signals such as image data.

Under the instruction of the CPU 19, the motor driver 16 drives the optical unit 11 and the shutter 12 to change positions of the optical unit 11 and to open and close the shutter 12.

Under the instruction of the CPU 19, the timing signal generator 17 generates timing signals to activate the CCD 13, the CDS circuit 14, and the A/D converter 15. Further, the image processing circuit 18, the compression/expansion circuit 23, and the memory card 24 can be controlled by the CPU 19.

The image processing circuit 18 temporarily stores image data output from the A/D converter 15 in the SDRAM 22, and performs various image processing to the image data. The various image processing includes, for example, YCrCb conversion process, white balance control process, contrast process, edge enhancement process, and color conversion process. Further, the image processing circuit 18 instructs to display an image corresponding the image data having received various image processing on the LCD 26.

The white balance control process is a process of adjusting density of colors of image corresponding to image data. The contrast process is a process of adjusting contrast of image corresponding to image data. The edge enhancement process is a process of adjusting sharpness of image corresponding to image data. The color conversion process a process of adjusting color tone of image corresponding to image data.

The ROM 21 stores programs used for executing the subject tracking and subject movement prediction to be described later. The CPU 19 executes programs stored in the ROM 21 using the RAM 20 as a working memory.

Based on an instruction input via the operation unit 25, the compression/expansion circuit 23 compresses the image data having received various image processing by the image processing circuit 18, and stores the compressed image data in the memory card 24. Further, the compression/expansion circuit 23 expands the image data read from the memory card 24 and outputs the image data to the image processing circuit 18.

Figure 2:
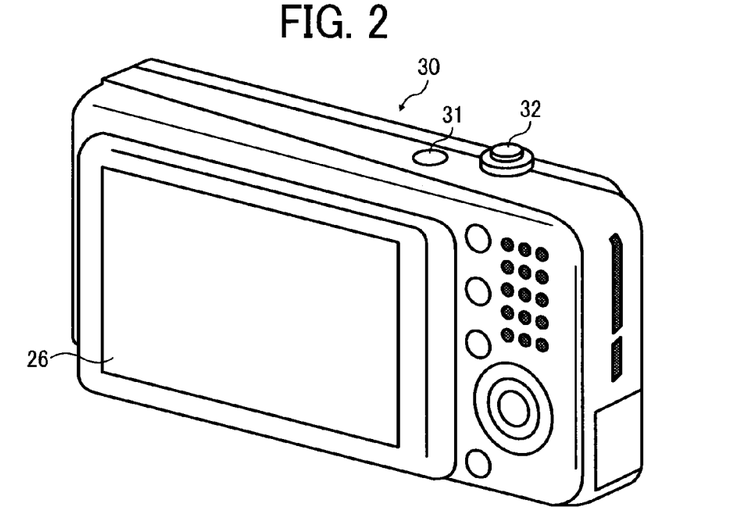
FIG. 2 is a perspective view of the image capturing apparatus of FIG. 1.

The operation unit 25 can be configured with buttons, switches, levers, and a touch panel. For example, the touch panel is disposed on the LCD 26. As illustrated in FIG. 2, the image capturing apparatus 30 includes buttons such as a power button 31 and a shutter button 32 at the top at the rear of the image capturing apparatus 30, and the LCD 26 at the rear of the image capturing apparatus 30, in which the power button 31 and the shutter button 32 can be used as the operation unit 25.

The shutter button 32 is a two-step switch. When a user half-presses the shutter button 32, a half-press signal is transmitted to the CPU 19, and when the user presses the shutter button 32 all the way, a full-press signal is transmitted to the CPU 19.

The LCD 26 can be configured with a liquid crystal panel that can display color images, and a touch panel. The LCD 26 can be used as an image display panel to display captured images, and a user interface panel to set various settings using the LCD 26. The touch panel of the LCD 26 can receive tapping and drag operation by a user. Further, the LCD 26 can display through images for monitoring with a frame rate such as one frame per one-thirtieth second (1/30 second). Further, the LCD 26 can be used as a finder of checking the angle of view, and a target tracking area setting unit to set a target tracking area to be described later.

The image processing program executable by the image processing apparatus 1 can be used to configure modules for the subject tracking, and movement prediction to be described later. The image processing program executable by the image processing apparatus 1 can be executed by a hardware. Specifically, the CPU 19 reads the image processing program from the ROM 21 used as a storage medium, and executes the image processing program, with which each of units shown in FIG. 3 can be implemented, and the subject tracking and the movement prediction can be performed.

Figure 3:
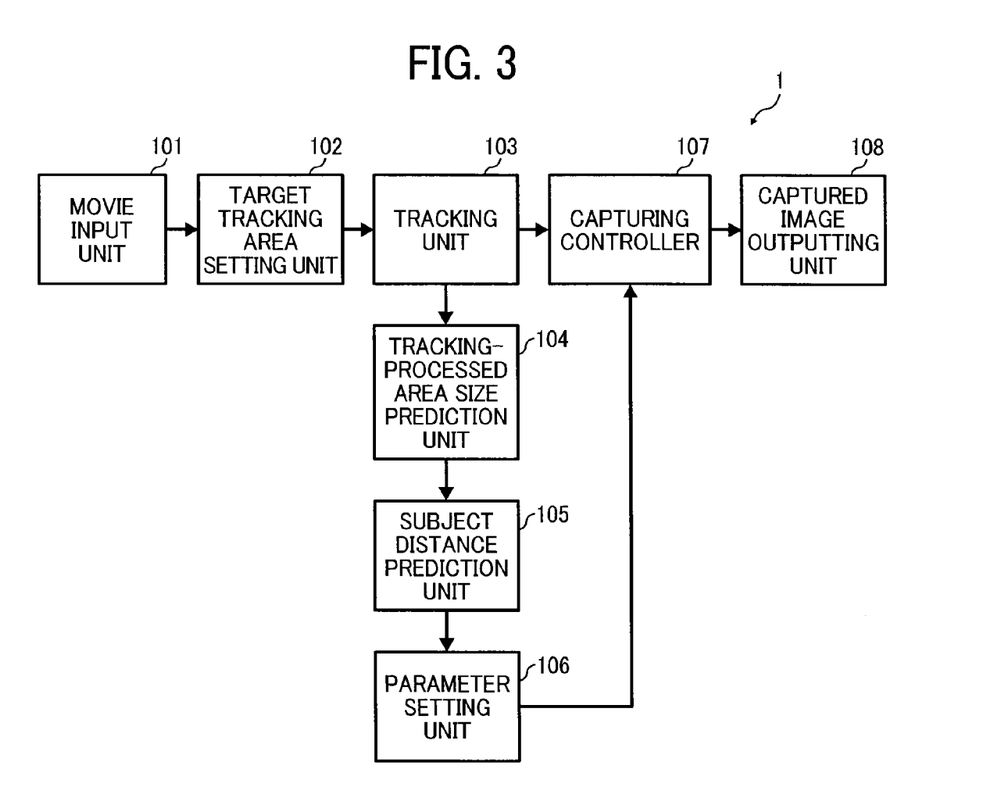
FIG. 3 is a functional block diagram of an image processing apparatus according to one or more example embodiments of the present invention.

FIG. 3 is a functional block diagram of the image processing apparatus 1. The image processing apparatus 1 includes, for example, a movie input unit 101, a target tracking area setting unit 102, a tracking unit 103, a tracking-processed area size prediction unit 104, a subject distance prediction unit 105, a parameter setting unit 106, a capturing controller 107, and a captured image outputting unit 108.

(Input of Movie Image)

The movie input unit 101, used as an image input unit, can be configured by the CPU 19 and the image processing circuit 18. When the image capturing apparatus 30 captures a plurality of image frames such as a movie image or a plurality of still images continuously along the time line by using the optical unit 11, the shutter 12, the charge coupled device (CCD) 13 and others, data of the plurality of image frames are sequentially input to the movie input unit 101. For example, movie image data such as through images output from the image processing circuit 18 and displayed on the LCD 26 of the image capturing apparatus 30 can be input to the movie input unit 101.

(Setting of Target Tracking Area)

Figure 4:
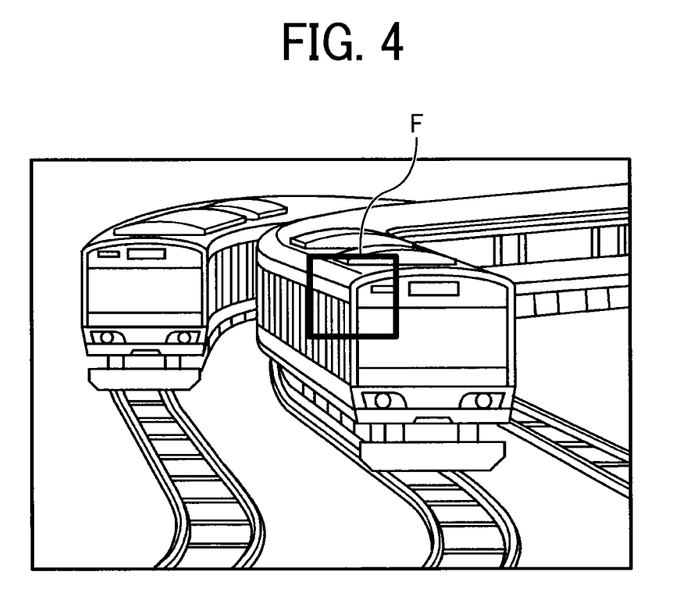
FIG. 4 schematically illustrates an image frame set with a target tracking area processable by the image processing apparatus.

The target tracking area setting unit 102 can be configured by the CPU 19, the operation unit 25, and the LCD 26. The target tracking area setting unit 102 sets a target tracking area including a focus position of a subject on one or more image frames input from the movie input unit 101. For example, FIG. 4 illustrates a target tracking area indicated by a rectangular frame F, which is shown by a bold line, in which the center of the target tracking area is set as the center of the focus position of the subject. Further, a size of the rectangular frame F indicates a size of the target tracking area. A position of the target tracking area (subject position) and size of the target tracking area (subject size) can be variably set by operating one or more buttons of the operation unit 25 and the touch panel of the LCD 26 while the shutter button 32 is being half-pressed by a user.

Further, the target tracking area setting unit 102 stores parameters set for the target tracking area as a subject condition "S" (x, y, Vx, Vy, Hx, Hy, M) in the RAM 20. As to the subject condition "S" (x, y, Vx, Vy, Hx, Hy, M), "x" and "y" indicate a position of the target tracking area (subject position) indicated by the rectangular frame F of FIG. 4, "Hx" and "Hy" respectively indicate a horizontal size and a vertical size of the target tracking area, "Vx" and "Vy" respectively indicate a horizontal-direction moving speed and a vertical-direction moving speed of the target tracking area, wherein the initial values of "Vx" and "Vy" are set zero, and "M" indicates a size change ratio of the target tracking area (change ratio of size), which is a change ratio of a size of the target tracking area between a previous image frame and a current image frame, wherein the initial value of "M" is set zero.

(Subject Tracking)

The tracking unit 103 can be configured by the CPU 19. The tracking unit 103 tracks a target tracking area from a previous image frame (previous observation) to a current image frame (current observation) by using Particle Filter. If the Particle Filter is used, even if a condition of a subject changes with non-linear manner and distribution of particles is non-Gaussian, the tracking of the subject can be performed with higher precision. Further, the method of subject tracking is not limited to the Particle filter, but other methods such as Mean Shift method, and Kalman filter method can be employed.

Figure 5:
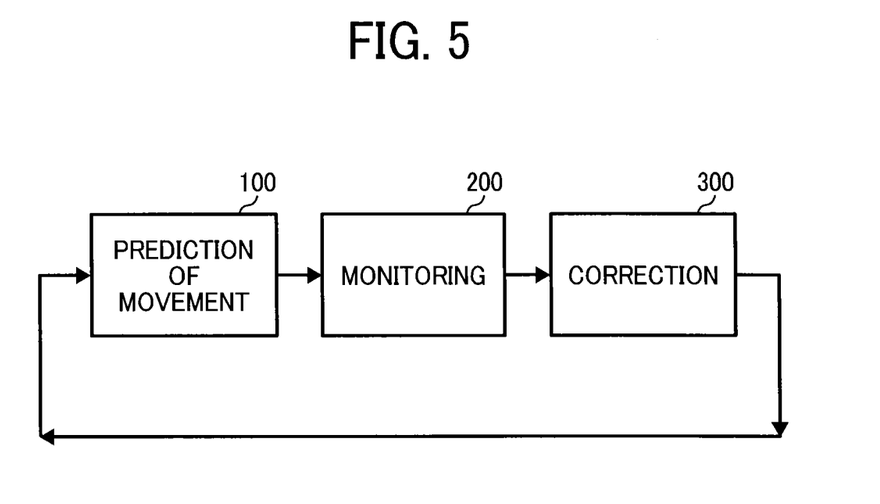
FIG. 5 is a process of tracking a subject performable by using a particle filter.

The tracking unit 103 tracks the target tracking area among a plurality of image frames along the time line to be described hereinafter. Specifically, the processing of the movement prediction, observation, and correction shown in FIG. 5 are repeatedly performed to the target tracking area to predict the condition of the subject.

(1: Prediction of Movement)

The condition prediction of a subject can be performed by using a known condition change model indicated by the below formula (1). The condition change model used for the Particle filter is non-linear.

$$S_k = f_k(S_{k-1}, V_{k-1}) \quad (1)$$

The formula (1) expresses the condition change from one condition "$S_{k-1}$" to a next condition "$S_k$." When the movement prediction is performed, the condition change or transition can be expressed by the below formulas (2) to (8).

$$x_k = x_{k-1} + V_{xk-1} * \Delta t \quad (2)$$

$$y_k = y_{k-1} + V_{yk-1} * \Delta t \quad (3)$$

$$V_{xk} = V_{xk-1} \quad (4)$$

$$V_{yk} = V_{yk-1} \quad (5)$$

$$M_k = M_{k-1} \quad (6)$$

$$H_{xk} = H_{xk-1}(1 + M_{k-1}) \quad (7)$$

$$H_{yk} = H_{yk-1}(1 + M_{k-1}) \quad (8)$$

By using the above formulas (2) to (8), the next condition "$S_k$" can be predicted from the previous condition "$S_{k-1}$."

(2: Observation)

Then, the condition observation formula (9) is applied to the condition "S" obtained at the movement prediction process to perform the observation.

$$z_k = h_k(S_k, n_k) \quad (9)$$

In the formula (9), "$z_k$" indicates observation data of the condition "$S_k$". The observation data can be expressed by a color histogram for the target tracking area (FIG. 4) of the subject. The calculation of the color histogram can be performed by using the formula (10).

In the formula (10), it is assumed that the target tracking area is composed of a given number of pixels such as "I" pixels, wherein "I" is a natural number. In the formula (10), "xi" indicates a position of the "i-th" pixel, "y" indicates a position of a pixel at the center of the target tracking area, "h(xi)" indicates a color pixel value of the "i-th" pixel, and "u" indicates a brightness value such as from 0 to 255, in which "i" is a natural number.

In this processing, "k(r)" indicated by the formula (11) is Kernel function used for calculating the color histogram. In the formula (10), Kernel function "k(r)" becomes zero when a distance between the pixel position "y" and the pixel position "xi" is a constant "a" or more, and Kernel function k(r) becomes the maximum value when the pixel position "y" matches the pixel position "xi." With this configuration, the number of pixels having the brightness "u" in the target tracking area can be calculated while reducing an effect of an area around the target tracking area in the formula (10).

$$p_y^{(u)} = f \sum_{i=1}^{I} k\left(\frac{\|y - x_i\|}{a}\right) \delta[h(x_i) - u] \quad (10)$$

$$k(r) = \begin{cases} 1 - r^2 & : r < 1 \\ 0 & : \text{otherwise} \end{cases} \quad (11)$$

The subject tracking can be performed by performing the movement prediction and observation shown in FIG. 5. In this configuration, the subject tracking is performed by using "N" number of prediction conditions "Sk(i)" for "N" number of particles (N: natural number), which means the number of particles used for the subject tracking is set "N". The "N" number of particles are evaluated, and a weight coefficient is calculated for each of the "N" number of particles. Then, a weighted average obtained from the calculated weight coefficients of the "N" number of particles indicated by the below formula (12) becomes the condition of the tracking-processed area.

$$S_k = \sum_{i=1}^{N} \pi^i S_k^{(i)} \quad (12)$$

A description is given of calculation of the weight coefficient. Distribution of particles expressed by the formula (12) is set as random sampling. The condition prediction of each one of the particles can be performed by using the below formula (1') and formulas (13) to (19), in which each of the formulas (13) to (19) is set by respectively adding a random variable to the formulas (2) to (8). Terms of "r1" to "r7" in the formulas (13) to (19) are Gaussian random variables.

$$S_k^{(i)} = f_k(S_{k-1}^{(i)}, V_{k-1}) \quad (1')$$

$$x_k = x_{k-1} + V_{xk-1} * \Delta t + r_1 \quad (13)$$

$$y_k = y_{k-1} + V_{yk-1} * \Delta t + r_2 \quad (14)$$

$$V_{xk} = V_{xk-1} + r_3 \quad (15)$$

$$V_{yk} = V_{yk-1} + r_4 \quad (16)$$

$$M_k = M_{k-1} + r_5 \quad (17)$$

$$H_{xk} = H_{xk-1}(1 + M_{k-1}) + r_6 \quad (18)$$

$$H_{yk} = H_{yk-1}(1 + M_{k-1}) + r_7 \quad (19)$$

The condition "Sk(i)" of each of the particles can be predicted by applying the formulas (13) to (19). A description is given of calculating the weight coefficient "π" of the predicted condition "Sk(i)." In this process, the color histogram "p" calculated by using the formula (10) for a target tracking area of a subject is used as a template. Further, the color histogram of each of the predicted "N" number of particles is set as "q," and Bhattacharyya coefficient expressed by the formula (20) is calculated. The Bhattacharyya coefficient indicates a similarity level between the color histogram "p" of the target tracking area of the subject and the color histogram "q" of one predicted particle. The greater the Bhattacharyya coefficient, the higher the similarity level of the two color histograms. In the formula (20), "m" is the number of the brightness "u" such as 256, which is the maximum number settable for the brightness "u".

$$\rho[p, q] = \sum_{u=1}^{m} \sqrt{p^{(u)} q^{(u)}}. \quad (20)$$

The weight coefficient "π" is calculated by using the formula (21) and the Bhattacharyya coefficient.

$$\pi^i = \frac{1}{\sqrt{2\pi}\,\sigma} e^{-\frac{d^2}{2\sigma^2}} = \frac{1}{\sqrt{2\pi}\,\sigma} e^{-\frac{(1-\rho[p,q])}{2\sigma^2}} \qquad (21)$$

$$d = \sqrt{1-\rho[p,q]} \qquad (22)$$

Based on the calculated weight coefficient "$\pi^i$" and the predicted condition "Sk(i)," the condition of the tracking-processed area applied with the Particle filter can be calculated by using the formula (12).

(3: Correction)

When the particles are predicted by using the formula (12), an effect of particles having smaller weight coefficients becomes smaller while the effect of particles having greater weight coefficients becomes greater in the formula (12), with which the number of effective particles decreases. To prevent this decrease, the particles having the smaller weight coefficients are deleted, and the particles having the greater weight coefficients are re-sampled and duplicated. With this processing, the "N" number of particles can be used effectively.

If a shape of a tracking subject changes gradually during the tracking, a template of the target tracking area of the subject is updated. In this process, if the average "$\pi^{ES}$" of the weight coefficients of the tracking-processed area calculated by the formula (12) becomes a value greater than a threshold "$\pi^T$" as indicated by the formula (23), the template is updated by using the formula (24), in which "$\alpha$" is a ratio coefficient, wherein the value of "$\alpha$" is set to a smaller value in the formula (24), and the color histogram of each of the particles in the target tracking area of the subject is updated.

$$\pi^{ES} > \pi^T \qquad (23)$$

$$q_t^{(u)} = (1-\alpha) q_{t-1}^{(u)} + \alpha p_{t-1}^{(u)} \qquad (24)$$

As described above, the subject tracking is performed by repeating the sequential processing of movement prediction, observation and correction. Based on the subject tracking, the condition "S" of the tracking-processed area can be calculated as a tracking result of the target tracking area. Further, since a time lag "$\Delta t$" of the image capturing apparatus 30 can be set as a pre-set value, the subject condition at a time point of the time lag "$\Delta t$" delayed from a time point when the shutter button 32 is pressed all the way can be predicted based on the condition at the time point when the shutter button 32 is pressed all the way. The subject condition at a time point of the time lag "$\Delta t$" means the position of the tracking-processed area indicated by "x" and "y" and the tracking-processed area size indicated by "Hx and Hy" at a time point corresponding to the time lag "$\Delta t$," Therefore, the image processing apparatus 1 can predict the subject condition on an image frame at a time point delayed for a given time from the most recently captured image frame along the time line of the plurality of input image frames.

In this process, the term of "Hx+Hy" is referred to a tracking-processed area size "X." The position of the tracking-processed area indicated by "x" and "y" at a time point when an image capturing operation is performed can be calculated by using the formulas (2) and (3), and the tracking-processed area size "X" at a time point when the image capturing operation is performed can be predicted by using the formulas (7) and (8).

However, the size change ratio "M" predicted from the previous image frame may have some error due to the effect of noise. Therefore, as described below, the tracking-processed area size "X" is predicted by applying a polynomial approximation to data of the plurality of the tracking-processed area sizes obtained from the tracking results of the plurality of image frames.

(Prediction of Tracking-processed Area Size)

From a time point when the shutter button 32 is half-pressed to a time point when the shutter button 32 is pressed all the way, a plurality of image frames is captured, and tracking results of the plurality of image frames can be obtained. The tracking-processed area size prediction unit 104 can predict the tracking-processed area size "X" at a time point corresponding to the time lag "$\Delta t$" as the subject condition by applying the polynomial approximation to the tracking results of the plurality of image frames. In other words, the tracking-processed area size prediction unit 104 can predict the tracking-processed area size "X" based on the condition "S" at a time point that the shutter button 32 is pressed all the way, and a plurality of conditions "S" obtained at time points before the time point when the shutter button 32 is pressed all the way.

A description is given of prediction of the tracking-processed area size "X" at a time point corresponding to the time lag "$\Delta t$" by using the tracking-processed area size prediction unit 104.

Figure 6:
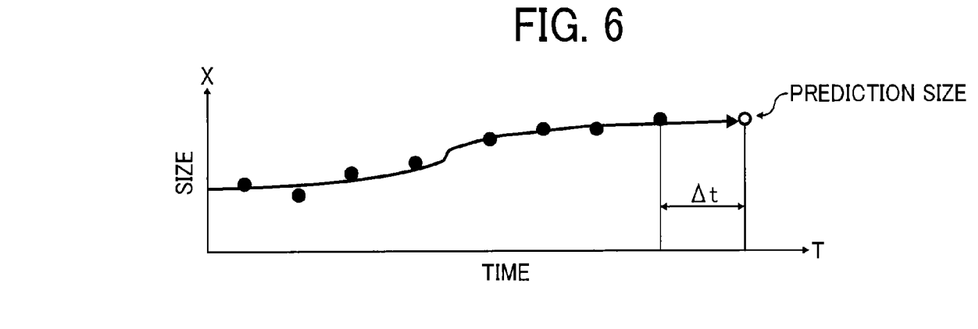
FIG. 6 is an example of a profile of tracking results obtained by the image processing apparatus.

FIG. 6 is an example of a profile of tracking results obtained by the image processing apparatus, in which the horizontal axis represents time "T", and the vertical axis represents the tracking-processed area size "X". Each of black dots indicates the tracking-processed area size at each one of image frames before the shutter button 32 is pressed all the way except the last black dot (right-end black dot) in FIG. 6 corresponding to a time point when the shutter button 32 is pressed all the way, while a white dot indicates a prediction size of the tracking-processed area size "X" at a time point corresponding to the time lag "$\Delta t$" delayed from the time point when the shutter button 32 is pressed all the way.

The formula (25) is a polynomial expression used for predicting the tracking-processed area size X at a time point corresponding to the time lag "$\Delta t$," in which "X" is the tracking-processed area size, "a" is a coefficient of polynomial expression, and "t" is time. As indicated by the formula (25), the tracking-processed area size "X" can be predicted when the coefficients of polynomial expression are obtained.

$$X = a_0 + a_1 t + a_2 t^2 + \ldots + a_{n-1} t^{n-1} \qquad (25)$$

Further, the formula (25) can be expressed by a matrix as indicated by the formula (26).

$$X = H^* A \qquad (26)$$

In this process, the vector "X" and the vector "A" in the formula (26) can be respectively expressed by the formula (27) and the formula (28). As to the formula (27), "$X_0$" to "$X_{m-1}$" are data of the tracking-processed area size at "m" points. As to the formula (28), "$a_0$" to "$a_{n-1}$" are "n" coefficients set for the polynomial expression.

Further, the matrix "H" in the formula (26) can be expressed by the formula (29).

$$X = \begin{bmatrix} X_0 \\ X_1 \\ \vdots \\ \vdots \\ X_{m-1} \end{bmatrix} \qquad (27)$$

$$A = \begin{bmatrix} a_0 \\ a_1 \\ \vdots \\ \vdots \\ a_{n-1} \end{bmatrix} \quad (28)$$

$$H = \begin{bmatrix} 1 & t_0 & t_0^2 & t_0^3 & \ldots & \ldots & t_0^{n-1} \\ 1 & t_1 & t_1^2 & t_1^3 & \ldots & \ldots & t_1^{n-1} \\ 1 & t_2 & t_2^2 & t_2^3 & \ldots & \ldots & t_2^{n-1} \\ 1 & t_3 & t_3^2 & t_3^3 & \ldots & \ldots & t_3^{n-1} \\ 1 & t_4 & t_4^2 & t_4^3 & \ldots & \ldots & t_4^{n-1} \\ 1 & t_5 & t_5^2 & t_5^3 & \ldots & \ldots & t_5^{n-1} \\ & \ldots & & & & & \ldots \\ & \ldots & & & & & \ldots \\ & \ldots & & & & & \ldots \\ 1 & t_{m-1} & t_{m-1}^2 & t_{m-1}^3 & \ldots & \ldots & t_{m-1}^{n-1} \end{bmatrix} \quad (29)$$

The coefficients of polynomial expression "$a_0$" to "$a_{n-1}$" can be calculated by using the formula (30) and the method of least squares.

$$A = (H^T H)^{-1} H^T X \quad (30)$$

When the coefficients of polynomial expression "$a_0$" to "$a_{n-1}$" are calculated by using the formula (30), the tracking-processed area size "X" at a time point corresponding to the time lag "$\Delta t$" can be calculated by using the formula (25).

(Prediction of Subject Distance)

Figure 7:
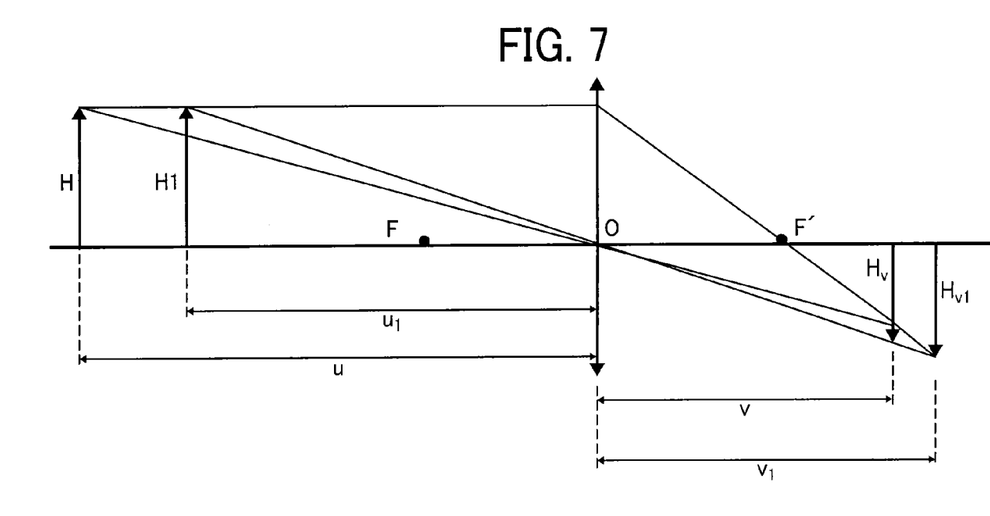
FIG. 7 illustrates a conjugate relationship of an optical unit of the image capturing apparatus.

As illustrated in FIG. 7, the subject distance prediction unit 105 can calculate the subject distance "$u_1$" as the subject condition at a time point corresponding to the time lag "$\Delta t$" when an image capturing operation is performed actually based on the subject distance "u" at a time point when the shutter button 32 is pressed all the way. The subject distance means the distance between the subject and the optical unit 11 of the image capturing apparatus 30.

A description is given of a method of predicting the subject distance "$u_1$" at a time point corresponding to the time lag "$\Delta t$" based on the tracking-processed area size "X" at a time point corresponding to the time lag "$\Delta t$" predicted by the tracking-processed area size prediction unit 104.

FIG. 7 illustrates a conjugate relationship of the optical unit 11, in which the principle of forming an image on an image sensor by using the optical unit 11 such as one or more lenses or the like is illustrated. In the configuration of FIG. 7, "u, Hv, v" respectively represents "subject distance, subject image height, subject imaging distance" at a time point when the shutter button 32 is pressed all the way while "$u_1$, $Hv_1$, $v_1$" respectively represents "predicted subject distance, predicted subject image height, predicted subject imaging distance" at a time point corresponding to the time lag "$\Delta t$," and "H" represents the subject height, and "F" represents the focal length of the optical unit 11.

As indicated in the configuration of FIG. 7, the conjugate relationship expressed by the formulas (31) and (32) can be set based on the similarity relationship of the triangle.

$$\frac{H}{u} = \frac{H_v}{v} \quad (31)$$

$$\frac{H}{u_1} = \frac{H_{v1}}{v_1} \quad (32)$$

Then, the formula (33) can be obtained from the formulas (31) and (32).

$$u_1 = u \frac{H_v}{H_{v1}} \frac{v_1}{v} \quad (33)$$

When the formula (33) is substituted in the formulas (34) and (35), which are the lens equations, the formula (36) can be obtained.

$$\frac{1}{u} + \frac{1}{v} = \frac{1}{F} \quad (34)$$

$$\frac{1}{u_1} + \frac{1}{v_1} = \frac{1}{F} \quad (35)$$

$$u_1 = u \frac{H_v}{H_{v1}} + F \frac{H_{v1} - H_v}{H_{v1}} \quad (36)$$

The predicted subject distance "$u_1$" can be calculated by using the formula (36), in which "Hv" is the subject image height on the imaging face of the CCD 13 when the shutter button 32 is pressed all the way, which is a known value, and the focal length "F" is also a known value. The predicted subject image height "$Hv_1$" on the imaging face of the CCD 13 can be calculated from the subject image height "Hv," the tracking-processed area size "X" when the shutter button 32 is pressed all the way, and the tracking-processed area size "X" at a time point corresponding to the time lag "$\Delta t$" calculated by using the formula (25) to (30). Therefore, the predicted subject distance "$u_1$" can be calculated by using the formula (36).

Further, if the focal length "F" is too small compared to the subject distance "u," the formula (36) can be approximated to the formula (37) because the second term of the formula (36) becomes too small compared to the first term of the formula (36). As indicated by the formula (37), the subject distance before and after the prediction is inversely proportional to the tracking-processed area size before and after the prediction.

$$u_1 \approx u \frac{H_v}{H_{v1}} \quad (37)$$

Therefore, the predicted subject distance "$u_1$" can be calculated by using the formula (36) or the formula (37). If a focus position (lens position) of the optical unit 11 of the image capturing apparatus 30 is set in view of the predicted subject distance "$u_1$", the focusing of the subject can be set correctly when the image capturing operation is performed for a subject moving with a high speed even if the time lag occurs for the image capturing operation.

(Setting of Capturing Parameter)

The parameter setting unit 106 can be configured by the CPU 19. The parameter setting unit106 sets one or more capturing parameters to the capturing controller 107 based on data of the subject condition output from the tracking unit 103, the tracking-processed area size prediction unit 104, and the subject distance prediction unit 105. As to the subject condition, the subject distance prediction unit 105 outputs the subject distance "$u_1$" at a time point corresponding to the time lag "$\Delta t$," the tracking-processed area size prediction unit 104 outputs the tracking-processed area size "X" at a time point corresponding to the time lag "Δt," and the tracking unit 103 outputs the position of the tracking-processed area indicated by "x" and "y" at a time point corresponding to the time lag "Δt."

The parameter setting unit 106 sets a focus position of the optical unit 11 to the capturing controller 107 as a capturing parameter based on the subject distance "$u_1$" at a time point corresponding to the time lag "Δt." Further, the parameter setting unit106 sets an exposure level to the capturing controller 107 as a capturing parameter based on the position of the tracking-processed area indicated by "x" and "y" at a time point corresponding to the time lag "Δt," and the tracking-processed area size "X" at a time point corresponding to the time lag "Δt."

The capturing controller 107 can be configured by the CPU 19. The capturing controller 107 performs the focus control and the exposure control to the above described predicted tracking-processed area by applying the above described capturing parameters, and then the capturing controller 107 captures the subject at a time point corresponding to the time lag "Δt" delayed from a time point when the shutter button 32 is pressed all the way.

Further, the capturing controller 107 also performs the focus control and the exposure control to the tracking-processed areas being updated sequentially while the shutter button 32 is being half-pressed by applying the capturing parameters. In this process, the capturing parameters can be set based on the subject distance "u," the position of the tracking-processed area indicated by "x" and "y" obtainable by using the formulas (2) and (3), and "Hx" and "Hy" indicating the tracking-processed area size obtainable by using the formulas (7) and (8).

The captured image outputting unit 108 can be configured by the LCD 26, the compression/expansion circuit 23, and the memory card 24. The captured image outputting unit 108 compresses the image frames having received the focus control and the exposure control by the capturing controller 107, and stores the compressed image frames in the memory card 24. Further, the captured image outputting unit 108 can display the image frames having received the focus control and the exposure control on the LCD 26.

Figure 8:
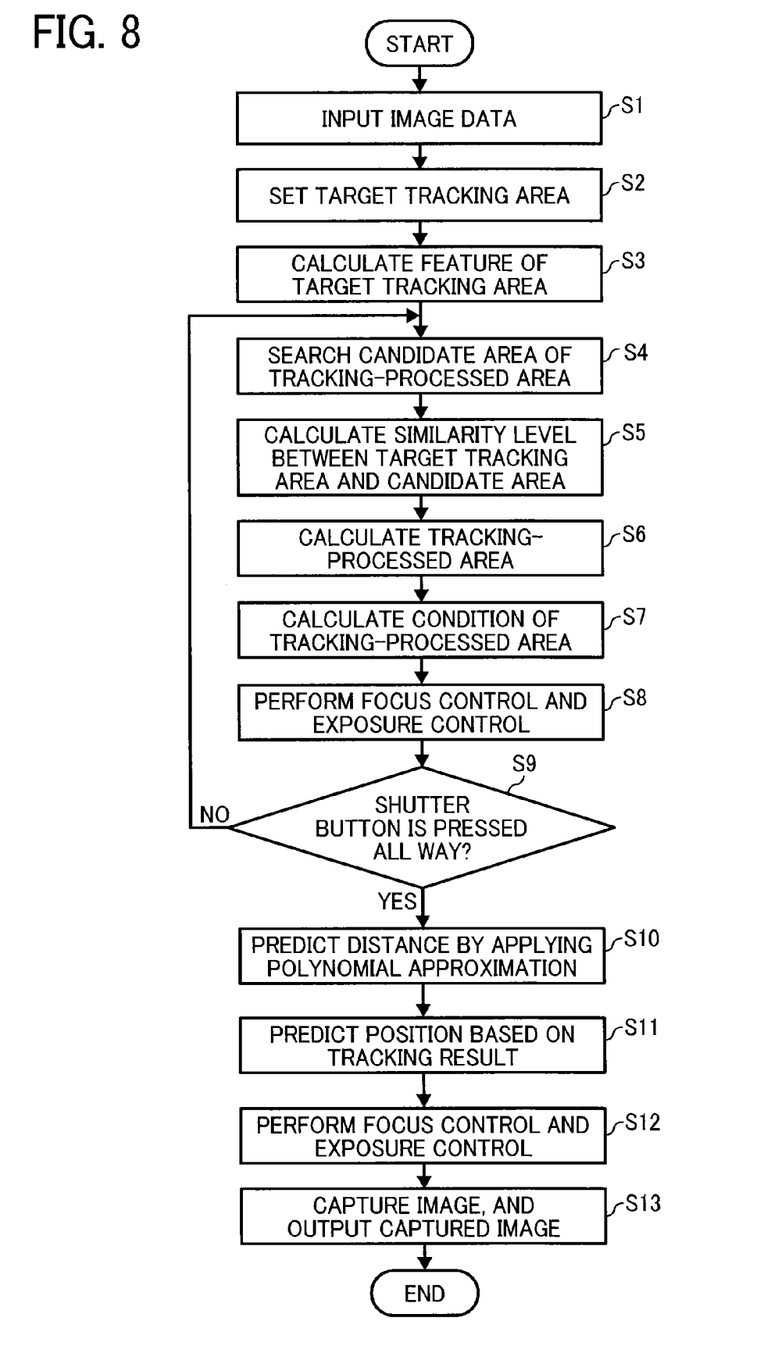
FIG. 8 is a flow chart showing the steps of a process of tracking a subject and predicting a movement of the subject implementable by the image processing apparatus.

A description is given of a process implementable by the image processing program executable by the image processing apparatus 1 with reference to FIG. 8, which is a flow chart showing the steps of a process of tracking a subject and predicting a movement of the subject implementable by the image processing apparatus 1. Specifically, when a user half-presses the shutter button 32, the sequence of FIG. 8 starts.

At step S1, the movie input unit 101 is input with image data such as a plurality of image frames of a subject captured along the time line, in which the image frames are movie images or a plurality of still images captured by the image capturing apparatus 30 along the time line. For example, data of movie image of through images displayed on the LCD 26 of the image capturing apparatus 30 are sequentially input.

At step S2, the target tracking area setting unit 102 sets a target tracking area of the subject on an image frame F(k−1).

At step S3, the tracking unit 103 calculates a feature of the target tracking area. For example, the tracking unit 103 calculates a color histogram of the target tracking area as the feature by using the formula (10).

At step S4, the tracking unit 103 searches a candidate area of the tracking-processed area on an image frame F(k), which is a next frame of the image frame F(k−1), by using the formulas (13) to (19).

At step S5, the tracking unit 103 calculates the feature of the candidate area of the tracking-processed area on the image frame F(k). For example, a color histogram of the candidate area of the tracking-processed area is calculated as the feature. Further, the similarity level between the target tracking area on the image frame F(k−1), and the candidate area of the tracking-processed area on the image frame F(k) is calculated by using the formula (20) and the features calculated at step S3 and step S5.

At step S6, the tracking unit 103 calculates or determines the tracking-processed area on the image frame F(k) by using the formula (12). At step S7, the tracking unit 103 calculates each of parameters configuring the condition "$S_k$" of the tracking-processed area, obtainable by the formula (12), by using the formula (2) to (8). Among these parameters, a position of the tracking-processed area on the image frame F(k) can be obtained based on the position of the tracking-processed area indicated by "x" and "y," and "Hx" and "Hy" indicating the tracking-processed area size.

At step S8, the capturing controller 107 performs the focus control and the exposure control to the tracking-processed area based on the subject distance "u," the position of the tracking-processed area indicated by "x" and "y," and "Hx" and "Hy" indicating the tracking-processed area size.

At step S9, the capturing controller 107 determines whether the shutter button 32 is pressed all the way. If the shutter button 32 is still being half-pressed, the sequence returns to step S4, and the tracking unit 103 searches a candidate area of the tracking-processed area on a new image frame F(k+1). By contrast, if the shutter button 32 is pressed all the way, the sequence proceeds to step S10.

At step S10, the tracking-processed area size prediction unit 104 calculates the tracking-processed area size "X" at a time point corresponding to the time lag "Δt" by applying the polynomial approximation using the formula (25) to (30). Further, the subject distance prediction unit 105 calculates the predicted subject distance "$u_1$" at a time point corresponding to the time lag "Δt" by using the formula (36) or formula (37).

At step S11, the tracking unit 103 calculates the position of the tracking-processed area indicated by "x" and "y" at a time point corresponding to the time lag "Δt" by using the formulas (2) and (3).

At step S12, the parameter setting unit 106 sets the capturing parameters based on the subject condition obtained at steps S10 and S11 to the capturing controller 107. Then, the capturing controller 107 performs the focus control and the exposure control to the tracking-processed area at a time point corresponding to the time lag "Δt" based on the set capturing parameters.

Then, at step S13, an image frame is captured, and the captured image outputting unit 108 compresses the image frame captured with the focus control and the exposure control set at step S12, and stores the compressed image frame in the memory card 24. Further, the captured image outputting unit 108 displays the image frame on the LCD 26.

In the above described image processing apparatus 1, the subject condition at a time point corresponding to the time lag "Δt" that is delayed from the most recent image frame of the plurality of image frames captured along the time line can be predicted based on the tracking results of the target tracking area being tracked among the plurality of image frames. In this configuration, the subject condition includes the position of the tracking-processed area indicated by "x" and "y," the tracking-processed area size "X" indicated by "Hx and Hy," and the subject distance "$u_1$" at a time point corresponding to the time lag "Δt" delayed from the time point when the shutter is released. Further, the capturing parameters determined from the predicted subject condition can be set to the image capturing apparatus 30.

With employing this configuration, even if the time lag occurs from the time point when the shutter is released to the time point when the image capturing is actually performed, the subject position and the subject distance can be predicted correctly, and the focus level and the exposure level can be set correctly by performing the movement prediction based on the tracking results of the plurality of image frames.

Further, as to the above described image processing apparatus 1, the polynomial approximation can be applied to the tracking-processed area size "X" of each of the image frames, with which the tracking-processed area size "X" at a time point corresponding to the time lag "Δt" can be predicted as the subject condition. With employing this configuration, the tracking-processed area size "X" at a time point corresponding to the time lag "Δt" can be predicted from the time point that the shutter is released, and the focusing of the subject can be performed correctly when to perform the image capturing operation.

Further, as to the above described image processing apparatus 1, the subject distance "$u_1$" at a time point corresponding to the time lag "Δt" can be predicted as the subject condition based on the focal length of the optical unit 11, the tracking-processed area size "X" at a time point corresponding to the time lag "Δt", and the conjugate relationship of the optical unit 11. With employing this configuration, the subject distance "$u_1$" at a time point corresponding to the time lag "Δt" delayed from the time point that the shutter is released can be predicted, and the focusing of the subject for the image capturing operation can be performed correctly.

Further, as to the above described image processing apparatus 1, the parameter setting unit 106 outputs the focus position of the optical unit 11 based on the predicted subject distance "$u_1$" as a capturing parameter. With employing this configuration, when to perform the image capturing operation at a time point corresponding to the time lag "Δt" delayed from the time point that the shutter is released, the focusing of the subject can be performed correctly.

Further, as to in the above described image processing apparatus 1, the parameter setting unit106 outputs the exposure level based on the predicted position of the tracking-processed area indicated by "x" and "y" at a time point corresponding to the time lag "Δt," and the predicted tracking-processed area size "X" indicated by "Hx and Hy" at a time point corresponding to the time lag "Δt" as a capturing parameter. With employing this configuration, when to perform the image capturing operation at a time point corresponding to the time lag "Δt" delayed from the time point that the shutter is released, the exposure of the subject can be performed correctly.

The above described image processing apparatus, image capturing apparatus, and image processing program can predict a position of a subject and a distance to the subject when an image capturing operation of the subject is to be performed based on one or more tracking results obtainable by tracking the subject before capturing an image of the subject actually.

The present invention can be implemented in any convenient form, for example using dedicated hardware platform, or a mixture of dedicated hardware platform and software. Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions. For example, in some embodiments, any one of the information processing apparatus may include a plurality of computing devices, e.g., a server cluster, that are configured to communicate with each other over any type of communication links, including a network, a shared memory, etc. to collectively perform the processes disclosed herein.

The computer software can be provided to the programmable device using any carrier medium or storage medium such as non-volatile memory for storing processor-readable code such as a floppy disk, a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), secure digital (SD) card, a solid state memory device or the like, but not limited these. Further, the computer software can be provided through communication lines such as electrical communication line. Further, the computer software can be provided in a read only memory (ROM) disposed for the computer. The computer software stored in the storage medium can be installed to the computer and executed to implement the above described processing. The computer software stored in the storage medium of an external apparatus can be downloaded and installed to the computer via a network to implement the above described processing.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by subject-oriented programming languages such as C, C++, C#, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image processing apparatus for processing images captured by an image capturing apparatus having an optical unit, the image processing apparatus comprising:
   processing circuitry configured to
      receive a plurality of image frames of a subject captured by the image capturing apparatus along a time line from the image capturing apparatus;
      set a target tracking area on the plurality of image frames;
      track the target tracking area on the plurality image frames along the time line between the plurality of image frames that are captured from a time point when a shutter button is partially pressed to a time point when the shutter button is fully pressed;
      predict a condition of the subject at a time point delayed from a time point when the most recent image frame of the plurality of image frames is captured based on a tracking result of the target tracking area being tracked along the plurality of image frames, wherein the condition of the subject is a tracking-processed area size; and
      set a parameter to be used for an image capturing of the subject based on the predicted condition of the subject, wherein the parameter is an exposure level that is set based on a focus position at a subject distance, a position of the tracking-processed area size, and a size of the tracking-processed area size.

2. The image processing apparatus of claim 1, wherein the processing circuitry predicts a position of the subject on one image frame at the time point, delayed from the time point when the most recent image frame of the plurality of image frames is captured, to determine the condition of the subject.

3. The image processing apparatus of claim 1, wherein the processing circuitry applies a polynomial approximation to the tracking result to predict a size of the subject on one image frame at the time point, delayed from the time point when the most recent image frame of the plurality of image frames is captured, to determine the condition of the subject.

4. The image processing apparatus of claim 1, wherein the processing circuitry predicts a distance to the subject from the optical unit at the time point, delayed from the time point when the most recent image frame of the plurality of image frames is captured, to determine the condition of the subject based on a focal length of the optical unit, the size of the subject predicted on the one image frame, and a conjugate relationship of the optical unit.

5. The image processing apparatus of claim 4, wherein the processing circuitry outputs a focus position of the optical unit calculated from the predicted distance between the subject and the optical unit as the capturing parameter.

6. The image processing apparatus of claim 2, wherein the processing circuitry outputs an exposure level calculated from the position and a size of the subject predicted on the one image frame as the capturing parameter.

7. An image capturing apparatus comprising:
   an image capture device including an optical unit to capture and output a plurality of image frames of a subject along a time line; and
   processing circuitry configured to
      receive the plurality of image frames of the subject captured by the image capture unit;
      set a target tracking area on the plurality of image frames;
      track the target tracking area on the plurality image frames along the time line between the plurality of image frames that are captured from a time point when a shutter button is partially pressed to a time point when the shutter button is fully pressed;
      predict a condition of the subject at a time point delayed from a time point when the most recent image frame of the plurality of image frames is captured based on a tracking result of the target tracking area being tracked along the plurality of image frames, wherein the condition of the subject is a tracking-processed area size; and
      set a parameter to be used for an image capturing of the subject to the image capture unit based on the predicted condition of the subject, wherein the parameter is an exposure level that is set based on a focus position at a subject distance, a position of the tracking-processed area size, and a size of the tracking-processed area size.

8. A non-transitory storage medium storing a program that, when executed by a computer, causes the computer to execute a method of processing a plurality of image frames of a subject captured by an image capturing apparatus, the method comprising:
   inputting the plurality of image frames of the subject captured by the image capturing apparatus along a time line;
   setting a target tracking area on the plurality of image frames input at the inputting step;
   tracking the target tracking area, set at the setting step, on the plurality of image frames along the time line between the plurality of image frames that are captured from a time point when a shutter button is partially pressed to a time point when the shutter button is fully pressed;
   predicting a condition of the subject at a time point delayed from a time point when the most recent image frame of the plurality of image frames is captured along the time line based on a tracking result of the target tracking area obtained at the tracking step, wherein the condition of the subject is a tracking-processed area size; and
   setting a parameter to be used for an image capturing of the subject based on the condition of the subject predicted at the predicting step to the image capturing apparatus, wherein the parameter is an exposure level that is set based on a focus position at a subject distance, a position of the tracking-processed area size, and a size of the tracking-processed area size.

* * * * *